United States Patent [19]
Longfellow

[11] 3,831,954
[45] Aug. 27, 1974

[54] GASKET JOINT CONNECTIONS

[75] Inventor: Richard C. Longfellow, Long Lake, Minn.

[73] Assignee: The Cretex Companies, Inc., Elk River, Minn.

[22] Filed: Nov. 24, 1972

[21] Appl. No.: 309,430

[52] U.S. Cl.............. 277/207, 277/9, 285/27, 285/231, 285/DIG. 19, 277/DIG. 2
[51] Int. Cl............................................. F16j 15/04
[58] Field of Search...... 285/27, 230, 231, DIG. 19; 277/1, 9, 11, 207, 207 A, 237, 134

[56] References Cited
UNITED STATES PATENTS
2,571,500  10/1951  Trevaskis..................... 285/DIG. 19
2,647,770  8/1953  Tollefsbol....................... 277/207 A

*Primary Examiner*—Louis R. Prince
*Assistant Examiner*—Robert I. Smith
*Attorney, Agent, or Firm*—Dorsey, Marquart, Windhorst, West & Halladay

[57] ABSTRACT

Accouterments for an improved gasket joint connection particularly useful in piping and the like. To obtain a water tight seal when joining or capping lengths of pipe, rubber or elastomeric gasket materials are utilized in a gasket which is imposed between the joining surfaces. In the improved joint connection the gasket groove and associated gasket are maintained in a fixed relationship relative to the compressing edge of the engaging pipe so that radial compression of the gasket takes place at varying rates around the circumference of the gasket instead of compressing all portions of the gasket at the same time. To accomplish this either the gasket or the compressing edge of the engaging member may be constructed or positioned as curvilinear surfaces, nonparallel multiple planes, or a nonparallel plane which is tilted away from the perpendicular to the longitudinal axis of the joint.

17 Claims, 10 Drawing Figures

PATENTED AUG 27 1974

GASKET JOINT CONNECTIONS

BACKGROUND OF THE INVENTION

In our industrial society it has always been important to quickly and efficiently joint lengths of pipe for various purposes with a minimum of effort and a minimum of wear and tear on the joining pieces or members. Pipe connections in the past when joining pipe and the like have been constructed so that the planes of the leading or compressing edges of the pipes to be joined, the gasket groove and sealing gasket are in a substantially parallel relationship. Thus compression of the gasket takes place at the same rate at each point around the circumference of the gasket which requires a relatively high peak force. Disadvantages of this method are obvious as, in addition to the magnitude of the instantaneous force necessary, occasionally the gasket tears or is pushed from the gasket groove forming an improper and inferior joint. A common method advances to facilitate joining of lengths of pipe has been to lubricate the joining pieces. An alternative method, which can also be used with the previous method, has been to taper the leading sections of the pipe to be joined. However, these designs still require that the gasket be compressed at the same rate at each point around the perimeter of the gasket with the previously mentioned disadvantages.

SUMMARY OF THE INVENTION

The present invention utilizes a nonparallel relationship between the gasket and the compressing edge of the pipe, thus allowing the gasket to be progressively compressed. This has been accomplished by either tilting the plane of either the gasket groove and associated gasket or the compressing edge of the pipe away from the plane perpendicular to the longitudinal axis of the pipe or alternatively, creating the gasket groove or engaging edge of the pipe as a contoured surface. It has been found that with this relationship the force necessary to join the pipe, due to the compression of the gasket, has been drastically and substantially reduced. The reduction in force required to so join the pipes thus not only greatly facilitates creating the joint but also effectively minimizes the disadvantages previously discussed with regard to pipe connections of the past.

A slightly modified variation to achieve the same result is created by utilizing a progressive radially directed taper as the compressing edge. All embodiments result in a joint wherein radial compression around the circumference of the gasket takes place gradually and not at the same time.

DESCRIPTION OF THE PREFERRED EMBODIMENT

Figure 1:
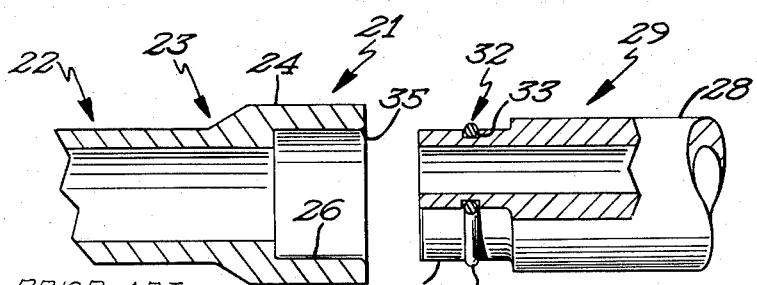
FIG. 1 is a side view partly in section of a conventional bell and spigot.

FIG. 1 shows a conventional bell and spigot joint. The bell 21 is formed, for example by casting, on the end of a length of pipe 22. The bell section 21 comprises a neck 23 and an enlarged portion 24 with an inner diameter 26 suitable to receive a mating length of pipe 28, usually of the same inner diameter as the length of pipe 22 to which the bell 21 is attached. It should be obvious, however, that the joining length of pipe 28 can be of any desired diameter with suitable construction of the inner diameter 26 of the bell 21.

As shown, the section of the pipe length 28 which is to be joined to the bell 21, referred to as the spigot 29, has a portion 31 which is of reduced outer diameter to assure a suitable fit upon insertion of the pipe 28 into the bell 21. Formed by any suitable method such as casting, machining, or grinding, into the outer diameter of the section 31 of the pipe 28 to be joined is a gasket groove 32 having a retaining edge 33 which retains the gasket 34. As indicated above, the gasket 34 can be composed of rubber or other elastomeric material which will assure a water tight seal. When the length of pipe 28 is forcefully inserted into the bell 21 the leading edge of the bell 35 compresses the gasket 34 into the gasket groove 32 and a water tight seal is formed.

Figure 2:
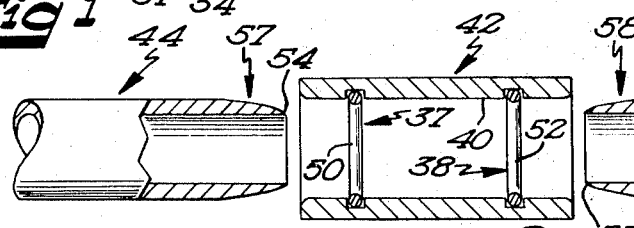
FIG. 2 is a side view partly in section of a conventional lateral joint.

The variation shown in FIG. 2 is also conventionally used, usually with smaller pipe sizes, wherein the gasket grooves 37, 38 are formed in the inner diameter 40 of the receiving portion 42 of the joint. FIG. 2 shows a lateral joint wherein two lengths of pipe 44, 45 are joined within a collar member 42 similar to the bell section 21 shown in and discussed with reference to FIG. 1. As shown, gasket grooves 37, 38 are formed in the receiving collar member 42 for both lengths of pipe 44, 45 to be joined. The same principle of operation applies as when the pipe sections 44, 45 are forcefully introduced into the receiving collar 42 the gaskets 50, 52 are compressed by the leading edges 54, 55 of the spigots 57, 58 forming a water tight seal. With either type of joint shown in FIGS. 1 and 2, insertion may conventionally be made easier by lubrication and, as shown in FIG. 2, by tapering the ends 57, 58 of the sections of the lengths of pipe 44, 45 which are inserted to make the joint.

It should be noted that in the conventional joints shown in FIGS. 1 and 2, the gaskets 34, 50, 52 are retained by gasket grooves 33, 37, 38 in planes perpendicular to the longitudinal axes of the joints and the sections of the joints 29, 42, respectively, which retain the gaskets 34, 50, 52. They are mated with sections of pipe 21, 57, 58 which also have leading and compressing edges 35, 54, 55 which are cut on planes perpendicular to the longitudinal axes of the joints. Therefore, of necessity, all portions of the gaskets 34, 50, 52 are compressed at the same rate.

Figure 8:
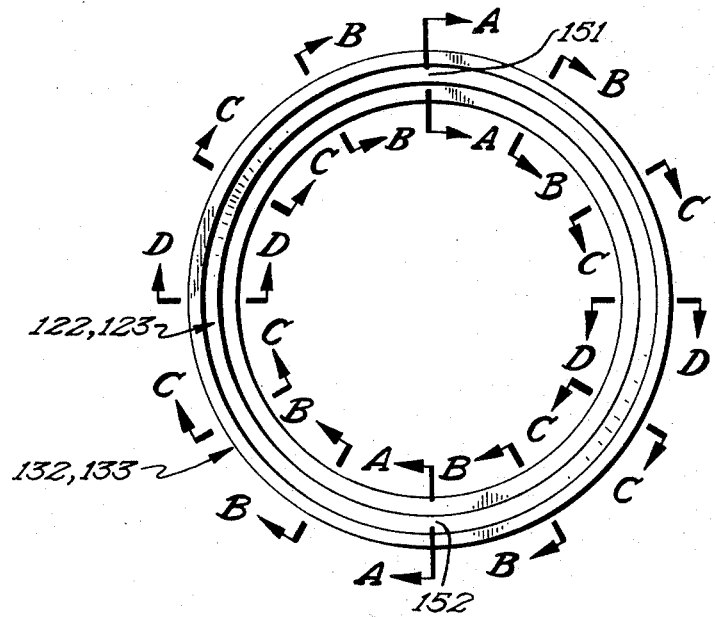
FIG. 8 is an end view of a bell which employs a progressive radially directed taper instead of a beveled leading edge as the compressing edge.

When the jointing force is plotted against the relative position of the bell and spigot of FIG. 1, the curve will have the approximate shape of FIG. 8, in which the indicia on the axes are given for convenience and comparative purposes only.

The improved method of joining sections of pipe which is the subject of my invention provides a pipe joint which is of equal utility and efficiency as the conventional joints discussed above but which requires substantially less force when effecting the joint. By constructing the joint in accordance with the teaching of my invention, the maximum force necessary to joint pipe is reduced by a magnitude on the order of approximately 4 to 1.

Figure 3:
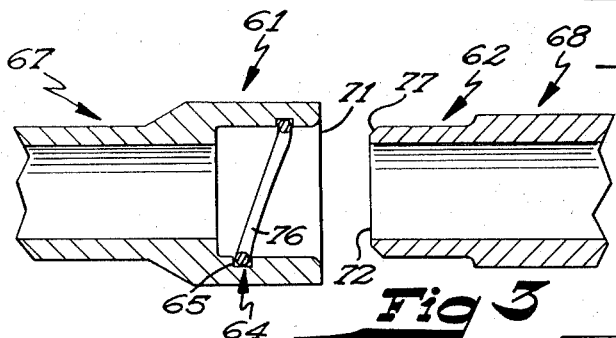
FIG. 3 is a side view partly in section of an improved bell and spigot pipe joint, which employs my invention, showing the gasket groove formed in the receiving member of the joint at an angle other than perpendicular to the longitudinal axis of the joint.

FIG. 3 shows a bell 61 and spigot 62 joint which is constructed in accordance with one variation of the improved pipe joint which is my invention. As shown in FIG. 3 the gasket groove 64 with retaining edge 65 is formed by any suitable method in a plane which is at an angle other than perpendicular to the longitudinal axis of the joint and the sections 67, 68 to be joined. The leading edges 71, 72 of the receiving bell 61 and the entering spigot 62 sections of the pipe 67, 68 can then be cut, as is conventionally done, perpendicular to the longitudinal axis of the pipe. With this construction, when the pipe sections 67, 68 are joined, the gasket 76 is progressively compressed around its circumference by the beveled compressing edge 77 resulting in a substantially reduced maximum force required to joint the pipes 67, 68.

Figure 5:
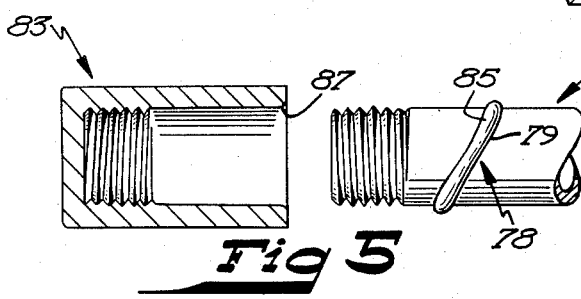
FIG. 5 is a side view partly in section of a nipple joint or cap showing a variation of my invention wherein the gasket groove is formed in the inserted member of the joint at an angle other than perpendicular to the longitudinal axis of the joint.

FIG. 5 shows a slightly varied embodiment of my improved pipe joint where the gasket groove 78 is formed into the section of pipe 82 to be inserted into the joint. The joint shown is a cap or nipple joint wherein the section of pipe to be capped 82 is threadly secured by the cap 83. As in FIG. 3 the gasket 85 is retained in the groove 78 by the retaining edge 79 of the groove 78 which is formed in a plane which is at an angle other than perpendicular to the longitudinal axis of the joint and section of pipe 82 to be joined. As above, the compressing edge 87 of the cap 83 may be beveled to initially lock the gasket 85 into the groove and to facilitate compressing of the gasket 85.

Figure 4:
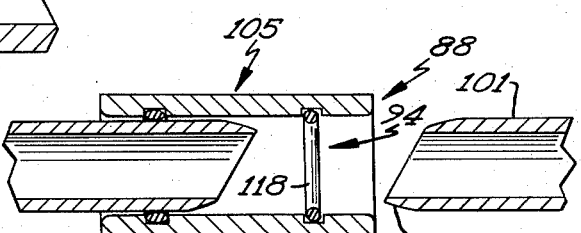
FIG. 4 is a side view partly in section of a lateral joint showing a variation of my invention wherein the compressing edge is formed in the inserted member of the joint which is cut at an angle other than perpendicular to the longitudinal axis of the joint.
Figure 7:
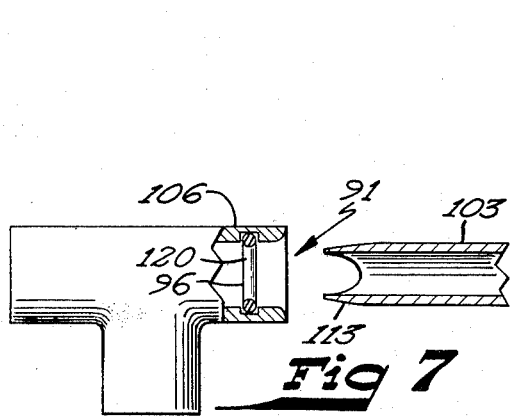
FIG. 7 is a side view partly in section of a tee joint showing a variation of my invention wherein the compressing edge is contoured and formed in the inserted member of the joint.
Figure 6:
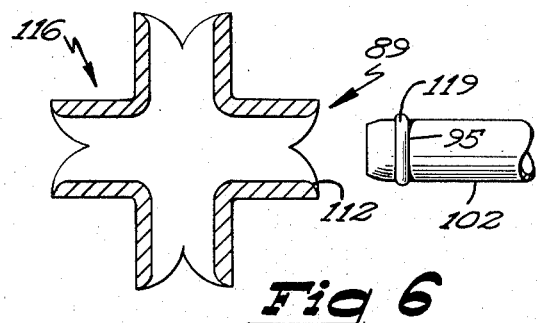
FIG. 6 is a side view partly in section of a cross joint showing a variation of my invention wherein the compressing edge is contoured and formed in the receiving member of the joint.

In FIGS. 4, 6 and 7 embodiment of my invention are shown which can be employed to adapt present piping to enable utilization of my invention. Respectively, a lateral joint 88, cross joint 89 and tee joint 91 are shown in the referenced Figures. In each the gasket groove 94, 95, 96 respectively is formed in a plane perpendicular to the longitudinal axis of the joint 88, 89, 91 and sections of pipes 101, 102, 103 to be joined. As in FIG. 2, the variations shown in FIGS. 4 and 7 depict the gasket groove 94, 96 formed in the joint member 105, 106, respectively, which receives the sections of pipe 101, 103. In FIG. 6 the gasket groove 95 is shown on the section of pipe 102 to be joined. In each case the leading edge 111, 112, 113 of the compressing member 101, 116, 103 is cut in such a manner that compression of the gaskets 118, 119, 120 takes place progressively around the circumference of the gasket 118, 119, 120 resulting in a substantial reduction in the required jointing force for conventional joints.

In the embodiment shown in FIG. 4 this result is obtained by cutting the joint member 101 so that the plane of the compressing edge 111 is at a slant or angle other than perpendicular to the longitudinal axis of the joint, thus creating progressive radial compression around the circumference of the gasket 118 between the two joint members 101, 105 which are maintained in a nonparallel relationship with respect to each other. In the embodiments shown in FIG. 6 and 7, the plane of the compressing edges 112, 113 of the joint member are contoured. Contouring in accorance with the invention can be achieved by utilizing a curvilinear disposition or nonparallel multiple planes such as by grooving or slotting. These two embodiments also utilize a gasket 119, 120 contained in a gasket groove 95, 96 which is perpendicular to the longitudinal axis of the joint. In other words, circumferential compression is accomplished between two joint members, at least one of which has a contoured nonplanar compressing edge.

Figure 9:
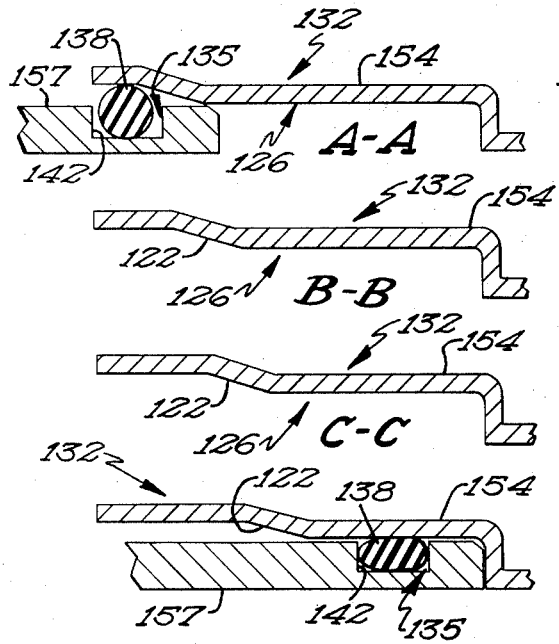
FIG. 9 shows a series of sectional views taken along the lines A—A, B—B, C—C, and D—D of FIG. 8 showing a progressive uniform taper as the compressing edge.
Figure 10:
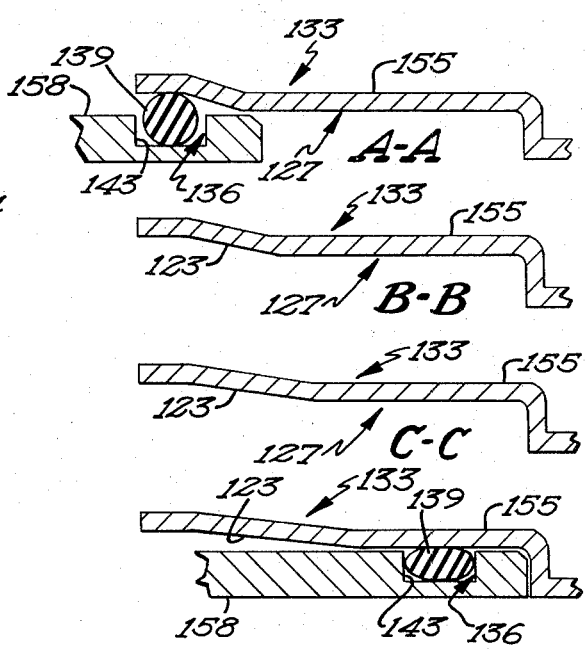
FIG. 10 shows a series of sectional views taken along the lines A—A, B—B, C—C, and D—D of FIG. 8 showing a progressive variable taper as the compressing edge.

FIGS. 8–10 show still another embodiment of the invention wherein the compressing edge 122, 123 is set back from the plane of the front face 126, 127 of the jointing member. Instead of utilizing the beveled edge of the pipe as the compressing edge as discussed above, radially directed tapers 122, 123 are formed, by any suitable method, in the inner diameter 126, 127 of the joining member 132, 133 not holding the gasket groove 135, 136. In these embodiments the gasket 138, 139 is preferably retained by the retaining edge 142, 143 of the gasket groove 135, 136 perpendicular to the axis of the pipe.

As shown in FIG. 9, with reference to FIG. 8, a progressive uniform taper 122 progresses longitudinally inward as the angle of the cross section increases from zero to ninety degrees. It then progresses longitudinally back to the beginning position as the angle is increased to one hundred eighty degrees. Thus, initially, the gasket 138 is engaged at two points, 151, 152 on FIG. 8. Thereafter, gasket 138 compression is distributed throughout the longitudinal jointing movement due to displacement by the tapered compressive area around the perimeter of the mating surface.

FIG. 10 shows a variation of a radially directed taper which utilizes a progressive variable taper 123 as the compressing edge. As shown in FIG. 10, the degree and length of the taper 123 change as the angle is increased.

The advantages of the radially directed taper are the same as for the other embodiments shown and described in that the gasket 138, 139 tends to lock into position as the first portion of the taper engages the gasket 135, 136 and thereafter the maximum necessary jointing force is substantially decreased. It should be obvious that if the gasket 135, 136 is retained in a gasket groove formed in the receiving or bell portion 154, 155 of a pipe, that the progressive taper 122, 123 can be formed in the inserted or spigot member 157, 158 of the joint.

Figure 11:
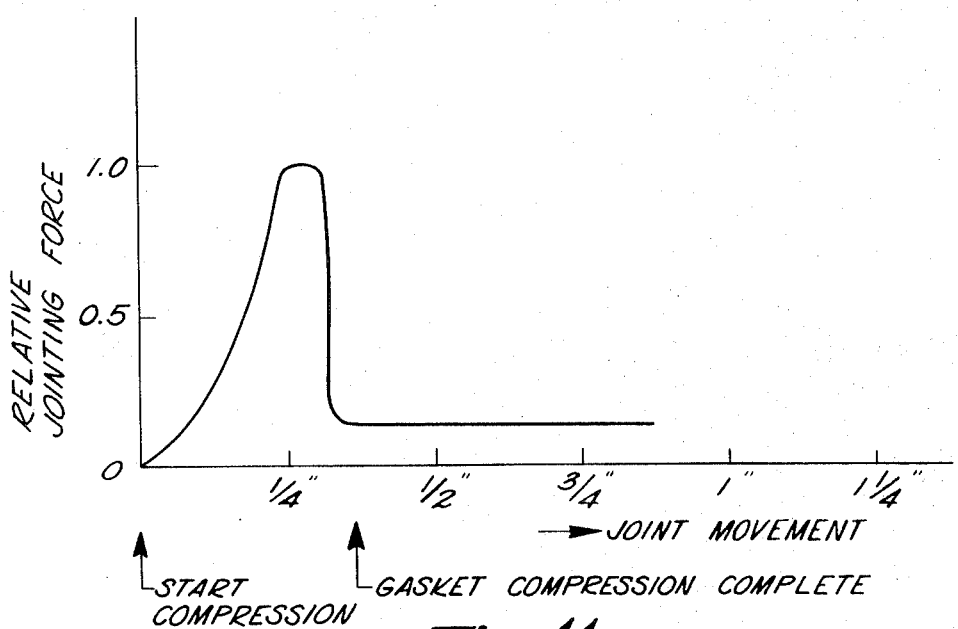
FIG. 11 is a force diagram showing the force necessary to join a conventional bell and spigot joint.
Figure 12:
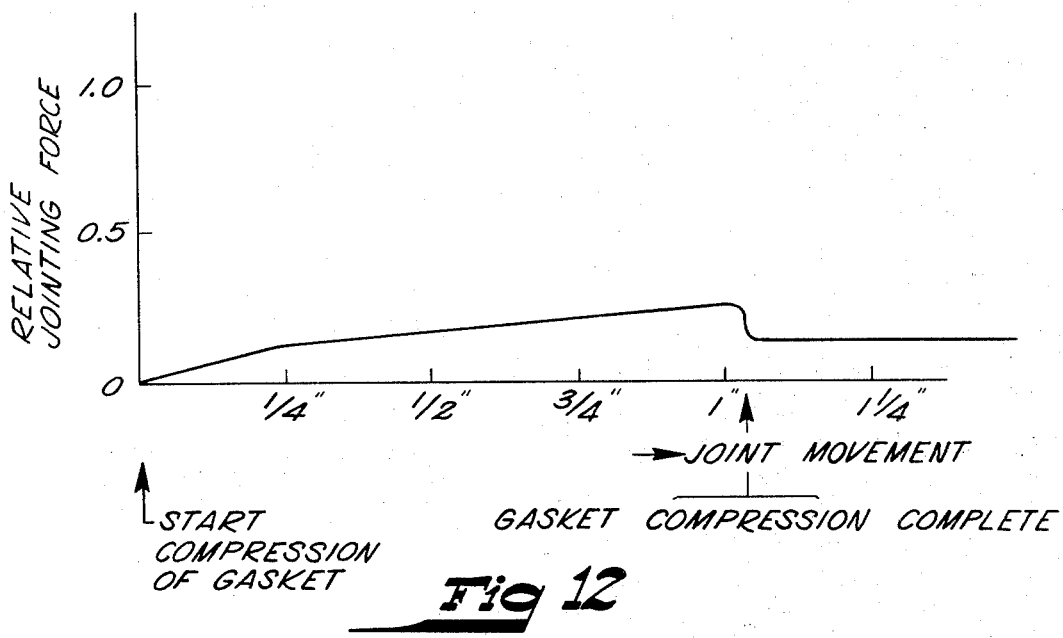
FIG. 12 is a force diagram showing the relative force necessary to join a bell and spigot joint constructed according to my invention.

By employing my invention the reduction that can be obtained in the magnitude of the required instantaneous joining force is significant. An order of magnitude indication of the reduction of force required to joint pipe can be visualized by comparing FIG. 11, which is the force necessary to joint a conventional bell and spigot joint similar to that shown in FIG. 1, with FIG. 12, which is the force required for jointing a bell and spigot joint constructed in accordance with my invention as shown in FIG. 3.

In general, while I have described various specific embodiments of my invention, it is to be understood that this is for purposes of illustration only and that other modifications, in form or configuration, of the present invention can be made without departing from its scope. For example the circumferential plane of the gasket and gasket groove may be contoured in the same manner as discussed with reference to the embodiments shown in FIGS. 6 and 7 and still be within the scope of my invention.

Having thus described my invention, I claim as my invention the following:

1. In an improved gasket joint connection for reducing the amount of force necessary to seal a joint at the end of a hollow pipe of the type having two hollow telescoping members, one member having a gasket groove with a gasket disposed therein facing the mating surface of the other member, the other member having a compressing edge, the improvement characterized by having the compressing edge extend varying distances from the surface bounded by the outer edge of the gasket groove so that only a portion of the compressing edge initially engages the gasket and the gasket is progressively compressed when one member is inserted into the other member.

2. In a gasket connection having:
a first joint member having at least one aperture with an inner diameter suitable for receiving a second joint member;
a second joint member having a cross section with an outer diameter suitable for insertion into the aperture of the first joint member and having a compressing edge;
a gasket groove formed in the inner diameter of the first joint member having a retaining edge; and
gasket means operatively disposed in the gasket groove, the improvement wherein the retaining edge of the gasket groove is non-parallel to the compressing edge of the second joint member during insertion of the second joint member into the first joint member so that when the second joint member is inserted into the first joint member the compressing edge of the second joint member progressively compresses the gasket means to form a seal between the first joint member and the second joint member.

3. The improved gasket joint connection of claim 2 wherein the gasket groove is formed in the inner diameter of the first joint member along a plane which is at an angle other than perpendicular to the longitudinal axis of the first joint member and wherein the plane of the compressing edge of the second joint member is formed perpendicular to the longitudinal axis of the second joint member whereby the plane of the retaining edge of the gasket groove is nonparallel to the compressing edge of the second joint member during insertion of the second joint member into the first joint member.

4. The improved gasket joint connection of claim 2 wherein the plane subscribed by the compressing edge of the second joint member is at an angle other than perpendicular to the longitudinal axis of the second joint member and the plane subscribed by the gasket groove is perpendicular to the axis of the first joint member whereby the plane of the compressing edge is nonparallel to the plane of the retaining edge of the gasket groove during insertion of the second joint member into the first joint member.

5. The improved gasket joint of claim 2 wherein the compressing edge of the second joint member comprises a progressive radially directed taper which is formed in the outer diameter of the second joint member.

6. In a gasket joint connection having:
a first joint member having at least one aperture with an inner diameter suitable for receiving a second joint member and having a compressing edge;
a second joint member having a cross section with an outer diameter suitable for insertion into the aperture of the first joint member;
a gasket groove formed in the outer diameter of the second joint member having a retaining edge; and gasket means operatively disposed in the gasket groove,
the improvement wherein the retaining edge of the gasket groove is nonparallel to the compressing edge of the first joint member during insertion of the second joint member into the first joint member so that when the second joint member is inserted in the first joint member the compressing edge of the first joint member progressively compresses the gasket means to form a seal between the first joint member and the second joint member.

7. The improved gasket joint connection of claim 6 wherein the gasket groove is formed in the outer diameter of the second joint member along a plane which is at an angle other than perpendicular to the longitudinal axis of the second joint member and wherein the plane of the compressing edge is formed perpendicular to the longitudinal axis of the first joint member whereby the plane of the retaining edge of the gasket groove is nonparallel to the plane of the compressing edge of the first joint member during insertion of the second joint member into the first joint member.

8. The improved gasket joint connection of claim 6 wherein the plane subscribed by the compressing edge of the second joint member is at an angle other than perpendicular to the longitudinal axis of the first joint member whereby the plane of the compressing edge is nonparallel to the plane of the retaining edge of the gasket groove during insertion of the second member into the first joint member.

9. The improved gasket joint of claim 6 wherein the compressing edge of the first joint member comprises a progressive radially directed taper which is formed in the inner diameter of the first joint member.

10. In a gasket joint connection having:
   a first joint member having at least one aperture with an inner diameter suitable for receiving a second joint member;
   a second joint member having a cross section with an outer diameter suitable for insertion into the aperture of the first joint member and having a compressing edge;
   a gasket groove formed in the inner diameter of the first joint member having a retaining edge; and
   gasket means operatively disposed in the gasket groove, the improvement wherein one of the edges is contoured differently than the other of the edges so that when the second joint member is inserted into the first joint member the compressing edge of the second joint member progressively compresses the gasket means to form a seal between the first joint member and the second joint member.

11. The improved gasket joint connection of claim 10 wherein the contour of the gasket groove formed in the inner diameter of the first joint member is multiplaner or curvilinear and the plane of the compressing edge of the second joint member is perpendicular to the longitudinal axis of the second joint member whereby there is a nonparallel and nonplaner relationship between the gasket groove and the compressing edge of the second joint member during insertion of the second joint member into the first joint member.

12. The improved gasket joint of claim 10 wherein the contour of the compressing edge of the second joint member is multiplaner or curvilinear and wherein the plane of the gasket groove is formed perpendicular to the longitudinal axis of the first joint member whereby there is a nonparallel and nonplaner relationship between the compressing edge of the second joint member and the gasket groove during insertion of the second joint member into the first joint member.

13. The improved gasket joint of claim 10 wherein the compressing edge of the second joint member comprises a progressive radially directed taper which is formed in the outer diameter of the second joint member.

14. In a gasket joint connection having:
   a first joint member having at least one aperture with an inner diameter suitable for receiving a second joint member and having a compressing edge;
   a second joint member having a cross section with an outer diameter suitable for insertion into the first joint member;
   a gasket groove formed in the outer diameter of the second joint member having a retaining edge; and gasket means operatively disposed in the gasket groove, the improvement wherein one of the edges is contoured differently than the other of the edges so that when the second joint member is inserted into the first joint member the compressing edge of the first joint member progressively compresses the gasket means to form a seal between the first joint member and the second joint member.

15. The improved gasket joint connection of claim 14 wherein the contour of the gasket groove formed in the outer diameter of the second joint member is multiplaner or curvilinear and wherein the plane of the compressing edge of the first joint member is perpendicular to the longitudinal axis of the first joint member whereby the gasket groove and the compressing edge of the first joint member are at a nonplaner relationship during insertion of the second joint member into the first joint member.

16. The improved gasket joint connection of claim 14 wherein the contour of the compressing edge of the first joint member is multiplaner or curvilinear and wherein the gasket groove is formed at a plane which is perpendicular to the longitudinal axis of the second joint member whereby the relationship of the compressing edge of the first joint member to the gasket groove is nonplaner during insertion of the second joint member into the first joint member.

17. The improved gasket joint connection of claim 14 wherein the compressing edge of the first joint member comprises a progressive radially directed taper which is formed in the inner diameter of the first joint member.

* * * * *